United States Patent
Vu Duong et al.

(10) Patent No.: US 7,924,796 B2
(45) Date of Patent: Apr. 12, 2011

(54) ROUTING METHOD IN AN AD HOC NETWORK

(75) Inventors: Thang Vu Duong, Ploulec'h (FR);
Noureddine Kettaf, Colmar (FR);
Abouaissa Hafid, Colmar (FR); Pascal Lorenz, Ammerschwihr (FR)

(73) Assignee: France Telecom, Paris (FR)

( * ) Notice: Subject to any disclaimer, the term of this patent is extended or adjusted under 35 U.S.C. 154(b) by 106 days.

(21) Appl. No.: 12/281,622

(22) PCT Filed: Mar. 1, 2007

(86) PCT No.: PCT/FR2007/050861
§ 371 (c)(1),
(2), (4) Date: Sep. 3, 2008

(87) PCT Pub. No.: WO2007/099263
PCT Pub. Date: Sep. 7, 2007

(65) Prior Publication Data
US 2009/0073893 A1    Mar. 19, 2009

(30) Foreign Application Priority Data
Mar. 3, 2006  (FR) .................. 06 50755

(51) Int. Cl.
*H04Q 7/24* (2006.01)
*H04J 3/16* (2006.01)
(52) U.S. Cl. .................. 370/338; 370/465
(58) Field of Classification Search .......... 370/338, 370/465
See application file for complete search history.

(56) References Cited

U.S. PATENT DOCUMENTS

| | | | |
|---|---|---|---|
| 2003/0202468 A1* | 10/2003 | Cain et al. | 370/229 |
| 2004/0156312 A1* | 8/2004 | Salonidis et al. | 370/229 |
| 2004/0235489 A1* | 11/2004 | Kwon | 455/452.2 |

(Continued)

OTHER PUBLICATIONS

Y. Sun et al., "A Priority-based Distributed Call Admission Protocol for Multi-hop Wireless Ad hoc Networks", Department of Computer Science, University of California, pp. 1-15, Jul. 2007 http://www.cs.ucsb.edu/research/tech_reports/reports/2004-20.pdf>.

(Continued)

*Primary Examiner* — Andrew Lee
(74) *Attorney, Agent, or Firm* — Cohen Pontani Lieberman & Pavane LLP

(57) ABSTRACT

A routing method in an ad hoc network between a source node (S) and a destination node (M) to guarantee a required quality of service level between the source node and the destination node. The source node (S) sends a route request to the network, request containing required quality of service level and an initial value of cost function (Fg). A node receiving a route request sent by a neighbor node then refuses said request if node is not able to guarantee said required quality of service level, and sends over the network a route request containing required quality of service level and a value of cost function combining a value of the cost function received from a previous neighbor node and a value of The cost function calculated on a connection with a neighbor node. The destination node (M) sends a route response step by step to the source node (S) containing the cumulative value of the cost function (Fg) corresponding to a route formed by successive connections between the source node (S) and the destination node (M). The source node chooses the route between the source node (S) and the destination node (M) having the best cumulative cost function.

13 Claims, 1 Drawing Sheet

U.S. PATENT DOCUMENTS

Figure 1:
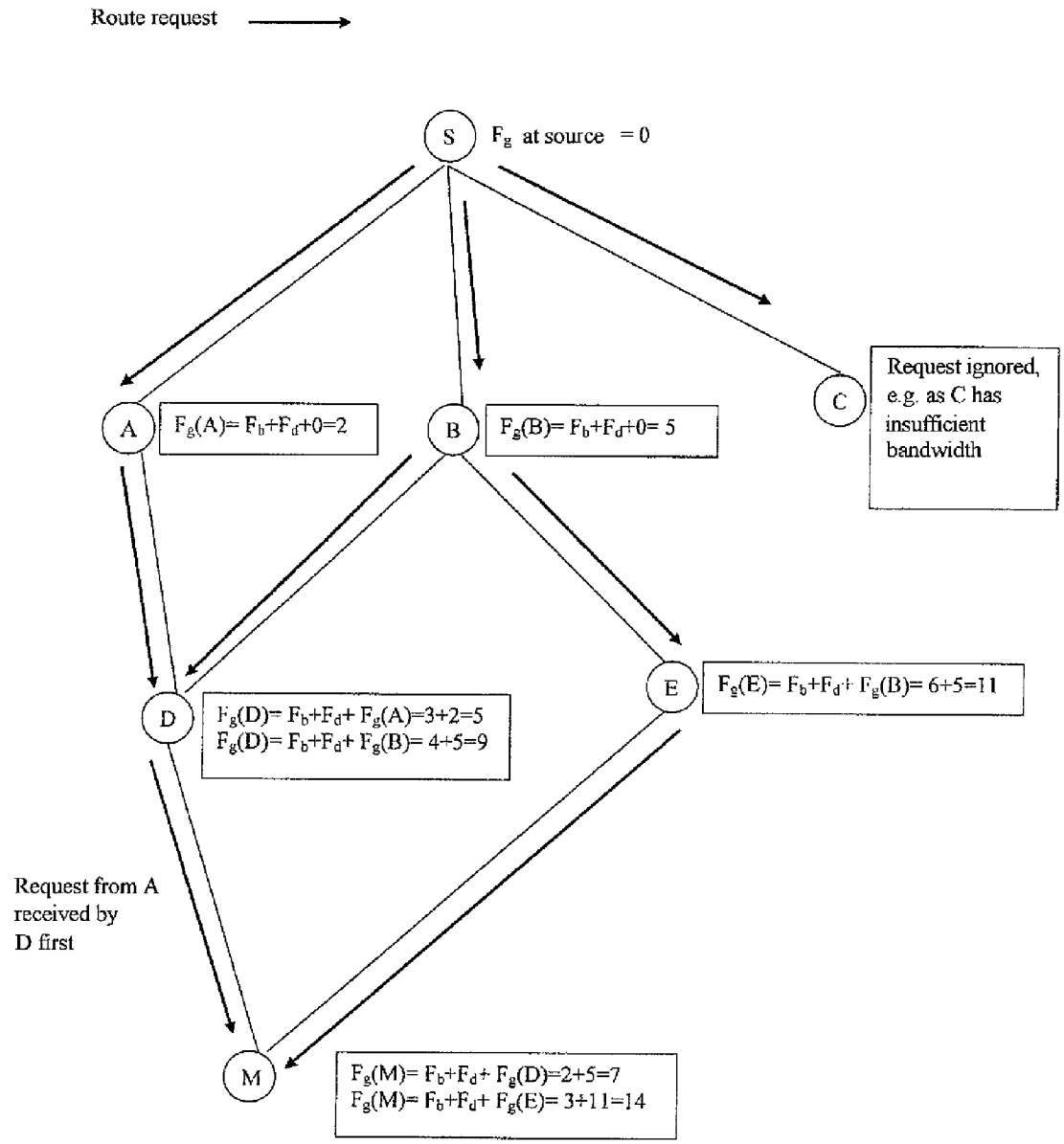

| | | | |
|---|---|---|---|
| 2006/0077942 A1* | 4/2006 | Panwar et al. | 370/338 |
| 2006/0165012 A1* | 7/2006 | Habetha | 370/254 |
| 2006/0176813 A1* | 8/2006 | Santhanankrishnan | 370/230 |
| 2006/0268792 A1* | 11/2006 | Belcea | 370/338 |
| 2007/0073935 A1* | 3/2007 | Kim et al. | 710/62 |
| 2007/0217406 A1* | 9/2007 | Riedel et al. | 370/389 |
| 2008/0285480 A1* | 11/2008 | Panwar et al. | 370/253 |

OTHER PUBLICATIONS

L. Chen et al., "QoS-aware routing based on bandwidth estimation for mobile ad hoc networks", IEEE Journal on Selected Areas in Communications, IEEE Service Center, vol. 23, No. 3, pp. 561-572, Mar. 2005.

N. Banerjee et al., "MODeRN: Multicast on-Demand QoS-Based Routing in Wireless Networks", IEEE Vehicular Technology Conference, vol. 3 of 4, Conf. 53, pp. 2167-2171, May 6, 2001.

Q. Xue et al., "Ad hoc QoS on-demand routing (AQOR) in mobile ad hoc networks", Journal of Parallel and Distributed Computing, vol. 62, No. 2, pp. 154-165, Feb. 2003, http://www.sciencedirect.com/science?_ob=MImg&imagekey=B6WKJ-48BBYH7-2-3R&_cdi=6908&_user=987766_orig=search&_coverDate=02%2F28%2F2003&_qd=1&sk=999369997&view=c&_alid=471558421&_rdoc=1&wchp=dGLbVtb-zSkWb&md5=cafaa570c0887fld43d65ce6c6379452&ie=/sdarticle.pdf>.

C. Perkins et al., "Ad hoc On-Demand Distance Vector (AODV) Routing draft-ietf-manet-aodv-13.txt", IETF Standard-Working-Draft, Internet Engineering Task Force, vol. manet, No. 13, Feb. 17, 2003, XP015002579.

* cited by examiner

ROUTING METHOD IN AN AD HOC NETWORK

RELATED APPLICATIONS

This is a U.S. national stage under 35 USC 371 of application No. PCT/FR2007/050861, filed on Mar. 1, 2007.

This application claims the priority of French patent application no. 06/50755 filed Mar. 3, 2006, the content of which is hereby incorporated by reference.

FIELD OF THE INVENTION

The present invention relates to a method of routing between a source node and destination node in an ad hoc network. The invention relates more particularly to reactive routing.

The invention finds an advantageous application in the general field of ad hoc networks and more specifically in evaluating and reserving resources in such networks to guarantee end-to-end quality of service (QoS) between the source node and the destination node.

BACKGROUND OF THE INVENTION

Ad hoc networks are spontaneous mobile wireless networks that require no fixed infrastructure and that are organized dynamically without intervention by users. The mere presence of terminals (microcomputers, personal digital assistants, devices onboard vehicles, sensors, etc.) equipped with radio interfaces is sufficient to create an ad hoc network.

In an ad hoc mobile network consisting of stations that have respective radio communications interfaces, a network node can communicate directly with its neighbors, i.e. nodes that are in range of its own interface, and can serve as a router for other mobiles of the network. This type of network is useful when no cable connection is available, for example during a conference, operations at the site of a disaster, or visits to a museum, and more generally when it is necessary to deploy a network quickly. In this situation, the nodes communicate by sending packets using a routing protocol.

Known ad hoc network routing protocols divide into two main categories.

Proactive protocols maintain permanent routes for all destinations in the network. Routes are therefore available immediately a node wishes to send data. Proactive protocols include the OLSR (Optimized Link-State Routing) protocol and the TBRPF (Topology Dissemination Based on Reverse Path Forwarding) protocol.

Reactive protocols rely on a mechanism for discovering routes on demand.

One known reactive protocol is the DSR (Dynamic Source Routing) protocol, which uses a source-directed routing model: when a station in the network sends data, all the data packets contain a list of all the intermediate hops that constitute the route to the destination. Thus the route used to transfer the data is imposed by the source. At the routing level, the protocol can be divided into two stages: route discovery and route maintenance.

Another known reactive protocol is the AODV (Ad hoc On-demand Distance Vector Routing) protocol described in *Ad hoc On-demand Distance Vector (AODV) Routing*, Charles E. Perkins, Elizabeth M. Belding-Royer and Samir Das, Internet Request For Comments RFC 3561, Internet Engineering Task Force, July 2003. The AODV protocol differs from the DSR protocol in its use of different route discovery and maintenance mechanisms. Moreover, the AODV protocol does not use source-directed routing.

The mechanisms used by the invention are similar to those used by the AODV protocol.

AODV route discovery is based on sending a Route Request (RREQ) followed by receiving a Route Reply (RREP). However, in contrast to the DSR protocol, the route request does not contain a list of intermediate hops. In the AODV protocol, each intermediate node forwarding a route request stores the address of the node from which it received the request. The AODV protocol also introduces the use of sequence numbers that prevent routing loops forming and that enable the nodes to tell the "freshness" of routes, i.e. their potential validity.

When the request reaches the destination, or a node having a recent route to the destination, a route response is sent step by step to the initiator of the request. Thus each node forwards the route response to the node from which it received the corresponding route request. All nodes on the path taken by the route response then create an entry in their respective routing tables for the target destination specifying as the next hop the address of the node that sent the route response. In contrast to the DSR protocol, the AODV protocol does not require a route between the source and the destination. In contrast, the AODV route discovery mechanism requires the presence of bidirectional connections between all nodes of the ad hoc network.

Where route maintenance is concerned, the AODV protocol relies on the ability of nodes of the network to detect broken connections. This detection is local, each node verifying whether the next hop used for forwarding a packet is available. The AODV protocol relies on a neighbor discovery mechanism based on periodically sending neighbor discovery (HELLO) messages enabling each node to discover its neighbor nodes. Receiving a neighbor discovery message tells a node that the connection between itself and the sender of the message is active. Moreover, to avoid overloading the network, only nodes having active routes send HELLO messages. If a node detects a broken connection, it sends a Route Error message to all its neighbors that use routes of which the broken connection is a part. Each node therefore maintains a table containing a list of its neighbors that use it as the next hop for certain destinations.

At present, constraints relating essentially to mobility and to radio communication have prevented the proposal of solutions for real-time and multimedia applications on ad hoc networks relating to guaranteeing quality of service and availability of network resources.

In the field of communications networks, the term "quality of service" denotes any mechanism for adapting network behavior to the requirements of applications. This concept encompasses mechanisms for allocating network resources to a data stream and for guaranteeing, for example, a given bandwidth, a limited end-to-end delay, lower jitter, a limited loss rate, etc. If the network is incapable of providing this level of service, it must advise the application that requested it of this fact.

None of the reactive routing protocols described above offers a mechanism able to guarantee quality of service. Data is therefore sent on an ad hoc basis, without taking account of QoS parameters, using the "best effort" principle.

Quality of service is taken into consideration by the AQOR (Ad hoc QoS On-demand Routing) protocol, which is a reactive protocol described in *Ad hoc QoS on-demand routing (AQOR) in mobile ad hoc networks*, Q. Xue and A. Ganz, Journal of Parallel and Distributed Computing, Vol. 63, issue 2, pp. 154-165, February 2003.

It proposes in particular a bandwidth reservation mechanism that functions in a similar way to a signaling protocol, using signaling functions for resource reservation and route maintenance. However, the bandwidth calculation involved is complex and costly and numerous signaling messages have to be exchanged, adding a considerable burden to the network.

SUMMARY OF THE INVENTION

One object of the present invention is to provide a simple, low-cost method of routing between a source node and a destination node in an ad hoc network that would not overload the network, guarantee end-to-end quality of service and reserve the corresponding available resources.

This and other objects are attained in accordance with one aspect of the present invention directed to a method that comprises the steps of:
in a preliminary step,
  evaluating at each node of the network a quality of service level for each connection between said node and the neighbor nodes;
  establishing a cost function representative of the cost in terms of resources necessary to guarantee a given quality of service level on a connection between a node and each of the neighbor nodes;
the source node sends a route request to the network, said request containing said required quality of service level and an initial value of said cost function;
a node receiving a route request sent by a neighbor node then;
  refusing said request if said node is not able to guarantee said required quality of service level;
  sending over the network a route request containing said required quality of service level and a value of said cost function combining a value of the cost function received from a previous neighbor node and a value of the cost function calculated on a connection with a neighbor node;
the destination node sending a route response step by step to the source node containing the cumulative value of said cost function corresponding to a route formed by successive connections between the source node and the destination node;
the source node choosing the route between the source node and the destination node having the best cumulative cost function.

In the context of the invention, evaluating quality of service at a node of the network for each connection between said node and its neighbor nodes includes evaluating the quality of service specific to the node concerned and evaluating the quality of service on the connection concerned.

Thus the routing method of an embodiment of the invention is of the reactive type, i.e. routes are searched for at the request of the source node, and is based on a connection admission control mechanism excluding use of an end-to-end signaling protocol, which generally overloads the network and increases costs. The quality of service resources are evaluated a priori at each node. Consequently, when searching for routes, only the nodes that support the required quality of service level forward a route request. The final route is finally chosen by the source node on the basis of the values of the overall cost function calculated for all allowed routes between the source node and the destination node, the route retained being generally that with the lowest global cost function.

Another technical problem to which the present invention offers an advantageous solution is evaluating resources between a node and a neighbor node.

A feature of the invention involves evaluating the quality of service level for each node of the network on each connection between said node and its neighbor nodes by means of a neighbor discovery message.

This new technique for estimating resources between each node and its neighbor nodes can be implemented by two mechanisms, the first combining the functions of the IEEE 802.11 standard to estimate residual bandwidth and the second using the round trip time (RTT) to evaluate the delay between two neighbor nodes.

This is an extremely simple way to estimate resources, much less complex and costly than the mechanism implemented by the AQOR protocol described above.

The neighbor discovery message enables a node to discover its neighbor nodes. It can be the HELLO message containing at least the address of the sender node.

In one embodiment, said quality of service level is evaluated as a function of the bandwidth of said connection. The cost function $F_b$ associated with the bandwidth is then given by the following equation, in which B is the bandwidth to be guaranteed, $B_{max}$ is the maximum bandwidth on said connection, and $B_{res}$ is the residual bandwidth:

$$F_b = B/[B_{max} - (B_{res} + B)]$$

In another embodiment, said quality of service level is evaluated as a function of the delay on said connection. The cost function $F_d$ associated with the delay is then given by the following equation, in which D is the delay on said connection, $D_{max}$ is the total maximum delay supported, and $\Sigma_{i\, to\, j} D_i$ is the sum of the cumulative delays on the connections i to j already traveled:

$$F_d = D/[D_{max} - (\Sigma_{i\, to\, j} D_i + D)]$$

If bandwidth and delay are cumulative, said cost function is a weighted sum of the cost functions $F_b$ and $F_d$, which are then referred to as elementary cost functions.

BRIEF DESCRIPTION OF THE ONLY DRAWING

The following description with reference to the appended drawing, which is provided by way of non-limiting example, explains clearly in what the invention consists and how it can be reduced to practice.

FIG. 1 represents a set of nodes in an ad hoc network.

DETAILED DESCRIPTION OF THE ONLY DRAWING

In the context of protocols reacting to demand, such as the AODV protocol described above, an object of the routing method of the invention is to provide simple mechanisms for evaluating the resources available at each network node, determining the best route between a source node S and a destination node M guaranteeing a required end-to-end quality of service level, and reserving the necessary resources at each node.

The disclosed method is based on the idea of a cost function associated with one or more metrics defining the quality of service, such as bandwidth, delay, jitter, error rate, energy, etc. To clarify and simplify this approach, two elementary metrics are considered here, namely bandwidth and delay. Of course, the invention can easily be extended to any other metric.

With the bandwidth is associated an elementary cost function $F_b$. The elementary cost function associated with the delay is denoted $F_d$. The global cost function $F_g$ is the sum, where applicable the weighted sum, of the elementary functions $F_b$ and $F_d$.

One example of the function $F_b$ is given by the following equation, in which $B_{max}$ represents the maximum bandwidth offered by the communication device on the connection between a node and neighbor node, B is the required bandwidth, and $B_{res}$ is the residual bandwidth corresponding to the remaining bandwidth:

$$F_b = B/[B_{max} - (B_{res} + B)]$$

Note that this function is a hyperbolic function, with low values when the required bandwidth B is low but very high values on approaching the available remaining bandwidth.

For a connection to be validated from the bandwidth point of view, the following condition must be satisfied:

$$B_{res} + B < B_{max} \quad (1)$$

Similarly, the elementary cost function $F_d$ can be defined as follows, where D is the estimated delay on the connection between a node and a neighbor node, $D_{max}$ is the total maximum delay supported, and $\Sigma_{i\,to\,j} D_i$ is the sum of the cumulative delays on the nodes already crossed:

$$F_d = D/[D_{max} - (\Sigma_{i\,to\,j} D_i + D)]$$

This function is also a hyperbolic function analogous to that of the function $F_b$.

A connection is considered valid from the delay point of view if:

$$\Sigma_{i\,to\,j} D_i + D < D_{max} \quad (2)$$

The global cost function $F_g$ is then as follows, where α and β are weighting coefficients:

$$F_g = \alpha F_b + \beta F_d$$

To guarantee a required quality of service in the ad hoc network, it is necessary to estimate the available bandwidth and the delay between a node and a neighbor node.

To this end, the disclosed method proposes to exploit neighbor discovery messages such as in particular the HELLO message used in the AODV routing protocol.

The residual bandwidth $B_{res}$ can be estimated at each node from the medium access control (MAC) sub-layer of the IEEE 802.11 standard, which provides an optional mode for exchanging control packets called RTS (Request To Send) packets and CTS (Clear To Send) packets. Before sending data, a node sends an RTS control packet to other nodes of the network. All the mobile nodes in range of the sender node that receive this RTS packet know that a call is going to take place. As the duration of the call is specified in the RTS packet, these mobile nodes can then refrain from sending during the whole of that period. This operation is effected using the network allocation vector (NAV) which stores the value of this period and serves as a clock. The node that receives the RTS packet sends back a CTS control packet if it is not itself blocked by its NAV. The CTS packet has the same effect as the RTS packet for mobile nodes in range of the receiver node. On reception of the CTS packet, the sender node knows that the medium has been reserved and that it can therefore send its data.

Based on the mode of operation of the IEEE 802.11 standard, each mobile node can determine free and busy times on the channel to estimate its residual bandwidth $B_{res}$. The channel is free if:
the NAV value is less than the current time value;
the "receive" state is free;
the "send" state is free.

In contrast, the channel is busy if:
the NAV sends a new value;
the "receive" state goes from free to another state;
the "send" state goes from free to another state.

Consequently, a node estimates the residual bandwidth from the ratio between the free times and the sum of the busy and free times:

$$B_{res} = \frac{\sum \text{free}}{\sum (\text{free} + \text{busy})}$$

In this context, the bandwidth $B_{max}$ is then the bandwidth offered by the IEEE 802.11 standard.

The delay can be estimated by measuring the time between a node sending a HELLO message and the same node receiving a response message sent by a neighbor node. This delay can be made equal to a time RTT divided by 2.

Note that this resource estimation technique differs because of its simplicity from those using in particular costly signaling mechanisms that are also a burden in terms of network load.

Starting from a quality of service required for the route searched for between the source node S and the destination node M, defined in the example discussed here by a bandwidth value B and a relay value D, the FIG. 1 source node S first sends a HELLO message to discover all of its neighbor nodes.

Then, to set up a route to the destination node M, the source node S sends a route request to the neighbor nodes in broadcast mode. This request contains the address of the destination node, the required quality of service, the initial value of the global cost function, taken as equal to 0, and a sequence number to maintain the consistency of the routing information. Because of the mobility of the nodes, routes change frequently, which invalidates the routing information held by certain nodes. The sequence number concept solves this problem by enabling the newest routes ("fresh routes") to be chosen.

Each neighbor node receiving the route request takes account of its local resources to respond to the required quality of service, to apply admission control. If the result of this check is positive, the route request is forwarded, also in broadcast mode, to the other neighbor nodes. If not, the received request is ignored, as at the node C in FIG. 1, for example.

In contrast, the nodes A and B support the required quality of service. They therefore reserve the available resources and update the value of the global cost function $F_g$, which is the sum of the values of the local functions $F_b$ and $F_d$:

$$F_g(A) = (F_b + F_d) + F_g(S) = 2 + 0 = 2 \quad (2)$$

$$F_g(B) = (F_b + F_d) + F_g(S) = 5 + 0 = 5 \quad (1)$$

where $F_b$ and $F_d$ correspond to the local elementary functions of each node with $(F_b + F_d) = 2$ at the node A and $(F_b + F_d) = 5$ at the node B. Of course, these numerical values are given by way of example only. $F_g(S)$ is the value of the global cost function supplied by the source node S, and this initial value is taken as equal to zero.

In their turn, the nodes A and B forward the route request to the other neighbor nodes in broadcast mode. When the nodes D and E receive this request, they execute the same procedure as the nodes A and B.

Note that in the FIG. 1 example the node D receives two route requests, one from the node A and the other from the node B. To lighten the network load in terms of control messages, by convention, the node D forwards only the request received first, for example that from the node A.

The destination node M finally receives two cumulative values of the global cost function:

$$F_g(M)=(F_b+F_d)+F_g(D)=2+5=7$$

$$F_g(M)=(F_b+F_d)+F_g(E)=3+11=14$$

These values are fed back by a Route Reply message sent by the destination node M that propagates step by step to the source node S. It contains the value of the global cost function, the address of the next neighbor node, and a sequence number.

The routing table of the node D contains the two values of the function $F_g$ received from the nodes A and B in two different route requests corresponding to the same destination with the same required quality of service level and a value of the function $F_g$ received from the destination node M in the Route Reply message.

The node D forwards the value of the function $F_g$ as received from the node M to the node from which the route request was received first by the node D (here the node A).

By means of a subtraction operation the node from which the route request was received second by the node D (here the node B) extracts the difference between the value of the function $F_g$ that it sent to the node M and that which it received in return from the same node M. The node D adds this difference to the value of the function $F_g$ that it did not send and sends the Route Reply message to the corresponding node, here the node B.

In the FIG. 1 example, the node D initially receives from the node A a route request to the destination node M containing the value $F_g(A)=2$.

It then receives from the node B a route request to the node M containing the value $F_g(B)=5$.

Under such circumstances, D rebroadcasts the route request to the node M, but with a value $F_g(D)$ combining the value $F_g(A)$ received first and the local value $(F_b+F_d)$. The value $F_g(D)$ transmitted to the node M is therefore:

$$F_g(D)=F_b+F_d+F_g(A)=3+2=5$$

When the node D receives in the response message from the node M the value $F_g(M)=7$ it forwards this value of $F_g$ to the node A as it stands, i.e. it forwards the value 7. In contrast, for the response to be sent to the node B, the node D deduces from $F_g(M)$ the value $F_g(D)$ sent, that is to say:

$$F_g(M)-F_g(D)=7-5=2$$

This difference of 2 will be added to other requests stored at the node D and seeking to reach the node M with the same quality of service.

When the source node S has received all the responses, it chooses the best route from all possible routes as a function of the values of the global cost function. The final route is generally that for which the cumulative value of the global cost function is lowest. In the FIG. 1 example, the lowest total global cost function is that of the route S-A-D-M with a value of 7 as against a value of 11 for the route S-B-D-M or 14 for the route S-B-E-M.

If a node detects a broken connection, it alerts all the neighbor nodes by means of a Route Error message in order to free up the resources that have been reserved and to warn the source node S. At the same time, each node recalculates its global cost function by subtracting from it the cost of the connection to the invalidated node. For example, if the connection is broken between the nodes B and E in FIG. 1, the value $F_g(B)$ is deducted from the global cost function at the node E, which initially had the value $F_g(B)+(F_b+F_d)$, likewise for the node B, which deducts the function $F_g(S)$ from its global function, which had the value $F_g(S)+(F_b+F_d)$, knowing that $F_g(S)=0$.

Other nodes on the route between the source node and the destination node that have not been warned of the broken connection wait for a particular TTL (Time To Live) after which, if no packet has arrived, they automatically free up their resources.

Finally, to reduce the network load, when a route is set up following execution of the routing process as just described, only nodes on that route continue to send neighbor discovery (HELLO) messages.

Note that in the example shown in FIG. 1, the cumulative cost function for a node is obtained by adding the value of the cost function received from a preceding neighbor node and the cost function on the connection between the node concerned and the same previous neighbor node, which justifies the initial value of zero. However, the cumulative result could be arrived at by adding the value of the cost function received from a previous neighbor and the cost function on the connection between the node concerned and the next neighbor node. Under such circumstances, the initial value supplied by the source node of the cost function would not be zero.

The invention claimed is:

1. A routing method in an ad hoc network between a source node (S) and a destination node (M), wherein, to guarantee a required quality of service level between the source node and the destination node, the method comprises the steps of:
   in a preliminary step:
      (a) evaluating at each node of the network a quality of service level for each connection between said node and the neighbor nodes;
      (b) establishing a cost function ($F_g$) representative of the cost in terms of resources necessary to guarantee a given quality of service level on a connection between a node and each of the neighbor nodes;
   the source node (S) sending a route request to the network, said request containing said required quality of service level and an initial value of said cost function ($F_g$);
   a node receiving a route request sent by a neighbor node then:
      (a) refusing said request if said node is not able to guarantee said required quality of service level;
      (b) sending over the network a route request containing said required quality of service level and a value of said cost function combining a value of the cost function received from a previous neighbor node and a value of the cost function calculated on a connection with a neighbor node;
   the destination node (M) sending a route response step by step to the source node (S) containing the cumulative value of said cost function ($F_g$) corresponding to a route formed by successive connections between the source node (S) and the destination node (M); and
   the source node choosing the route between the source node (S) and the destination node (M) having the best cumulative cost function.

2. The method according to claim 1, wherein, for each node of the network, the quality of service level on each connection between said node and the neighbor nodes is evaluated by means of a neighbor discovery message.

3. The method according to claim 1, wherein a node able to receive route requests sends a route request containing a value of said cost function combining the value of the cost function contained in a route request received first from a preceding neighbor node and a value of the cost function calculated on a connection with a neighbor node.

4. The method according to claim 1, wherein said route request contains a value of said cost function combining a value of the cost function received from a preceding neighbor node and a value of the cost function calculated on a connection with said preceding neighbor node.

5. The method according to claim 1, wherein said route request contains a value of said cost function combining a value of the cost function received from a preceding neighbor node and a value of the cost function calculated on a connection with a subsequent neighbor node.

6. The method according to claim 1, wherein said quality of service level is evaluated as a function of the bandwidth of said connection.

7. The method according to claim 6, wherein the cost function $F_b$ associated with the bandwidth is given by the following equation, where B is the required bandwidth, $B_{max}$ is the maximum bandwidth on said connection, and $B_{res}$ is the residual bandwidth:

$$F_b = B/[B_{max} - (B_{res} + B)].$$

8. The method according to claim 7, wherein said residual bandwidth is estimated from free times and busy times between two nodes.

9. The method according to claim 8, wherein said free times and said busy times are obtained from the IEEE 802.11 standard.

10. The method according to claim 1, wherein said quality of service level is evaluated as a function of the delay on said connection.

11. The method according to claim 10, wherein the cost function $F_d$ associated with the delay is given by the following equation, in which D is the delay on said connection, $D_{max}$ the total maximum delay supported, and $\Sigma_{i\,to\,j} D_i$ the sum of the cumulative delays on the connections i to j already traveled:

$$F_d = D/[D_{max} - (\Sigma_{i\,to\,j} D_i + D)].$$

12. The method according to claim 11, wherein said delay is estimated from measured times between a node sending a neighbor discovery message and the same node receiving a response message sent by a neighbor node.

13. The method according to claim 7, wherein said delay is estimated from measured times between a node sending a neighbor discovery message and the same node receiving a response message sent by a neighbor node, and wherein the cost function is a weighted sum of the cost functions $F_b$ and $F_d$.

\* \* \* \* \*